(12) United States Patent
Chiu

(10) Patent No.: US 12,488,843 B2
(45) Date of Patent: Dec. 2, 2025

(54) VOLTAGE GENERATING CIRCUIT

(71) Applicant: Winbond Electronics Corp., Taichung (TW)

(72) Inventor: Liang-Hsiang Chiu, Hsinchu County (TW)

(73) Assignee: Winbond Electronics Corp., Taichung (TW)

( * ) Notice: Subject to any disclaimer, the term of this patent is extended or adjusted under 35 U.S.C. 154(b) by 111 days.

(21) Appl. No.: 18/639,995

(22) Filed: Apr. 19, 2024

(65) Prior Publication Data

US 2024/0395337 A1    Nov. 28, 2024

(30) Foreign Application Priority Data

May 24, 2023   (TW) ................. 112119303

(51) Int. Cl.
*G11C 16/30*   (2006.01)
*H02M 1/00*   (2006.01)
*H02M 3/155*   (2006.01)

(52) U.S. Cl.
CPC .......... *G11C 16/30* (2013.01); *H02M 1/0048* (2021.05); *H02M 3/155* (2013.01)

(58) Field of Classification Search
CPC ..... G11C 16/30; H02M 1/0048; H02M 3/155; G05F 1/561
See application file for complete search history.

(56) References Cited

U.S. PATENT DOCUMENTS

| | | |
|---|---|---|
| 7,253,676 B2 | 8/2007 | Fukuda et al. |
| 10,726,927 B2 | 7/2020 | Murakami |
| 11,074,983 B2 | 7/2021 | Nakatani |
| 2005/0168263 A1 | 8/2005 | Fukuda et al. |
| 2008/0054991 A1 | 3/2008 | Maejima |
| 2008/0129377 A1 | 6/2008 | You et al. |
| 2008/0304349 A1 | 12/2008 | Suzuki et al. |

(Continued)

FOREIGN PATENT DOCUMENTS

| | | |
|---|---|---|
| CN | 101201638 | 6/2008 |
| CN | 105322786 | 2/2016 |

(Continued)

OTHER PUBLICATIONS

"Office Action of China Counterpart Application", issued on Aug. 21, 2025, p. 1-p. 10.

*Primary Examiner* — Xiaochun L Chen
(74) *Attorney, Agent, or Firm* — JCIPRNET

(57) ABSTRACT

A voltage generating circuit includes a first comparator, a boost circuit, a second comparator and an output circuit. The first comparator compares a first reference voltage with a first feedback voltage generated based on a first output node, and generates a first control signal accordingly. The boost circuit is controlled by the first control signal to output a boost voltage to the first output node. The second comparator compares a second reference voltage with a second feedback voltage generated based on a second output node, and generates a second control signal accordingly. The output circuit receives the boost voltage, and is controlled by the second control signal to convert the boost voltage into a drive voltage and output it to the second output node. The boost voltage is determined by the first reference voltage, the drive voltage is determined by the second reference voltage.

17 Claims, 2 Drawing Sheets

(56) References Cited

U.S. PATENT DOCUMENTS

2012/0063244 A1    3/2012  Kwon et al.
2017/0076800 A1    3/2017  Musha
2023/0318450 A1*  10/2023  Grande .................. G11C 16/30

FOREIGN PATENT DOCUMENTS

| CN | 106531221 | 3/2017 |
| CN | 105359049 | 5/2017 |
| CN | 110097911 | 8/2019 |
| TW | I685839   | 2/2020 |
| TW | I737290   | 8/2021 |

* cited by examiner

VOLTAGE GENERATING CIRCUIT

CROSS-REFERENCE TO RELATED APPLICATION

This application claims the priority benefit of Taiwan patent application serial no. 112119303, filed on May 24, 2023. The entirety of the above-mentioned patent application is hereby incorporated by reference herein and made a part of this specification.

BACKGROUND

Field of the Disclosure

The present disclosure relates to a voltage generating circuit, and in particular to a voltage generating circuit adaptable for semiconductor memory devices.

Description of Related Art

When it comes to semiconductor memory devices such as NAND-type or NOR-type flash memories, it is required to generate high voltage in the operation of incremental step pulse programming (ISPP) and incremental step pulse erase (ISPE). Generally speaking, these high voltages are boosted by a charge pump, and are stably provided to word lines through a voltage regulator. In order to allow the threshold voltage distribution of memory cells to be more concentrated, it is crucial to generate high voltage with high precision. Therefore, a large number of high-voltage components (such as potentiometers) must be arranged in the voltage generating circuit, which will not only increase the circuit area, but also increase the production cost. In addition, in the case of high temperature and high pressure, the Ioff leakage and impedance of the high-voltage components vary considerably. As a result, the linearity of the voltage regulation is poor and the precision of high voltage is reduced.

SUMMARY

The present disclosure provides a voltage generating circuit, which is able to precisely generate the required voltage while reducing the use of high-voltage components (such as potentiometers).

A voltage generating circuit of the disclosure includes a first comparator, a boost circuit, a second comparator and an output circuit. The first comparator compares a first reference voltage with a first feedback voltage generated based on a first output node, and generates a first control signal according to the comparison result. The boost circuit is coupled to the first comparator and the first output node, and is controlled by the first control signal to output a boost voltage to the first output node. The second comparator compares a second reference voltage with a second feedback voltage generated based on a second output node, and generates a second control signal according to the comparison result. The output circuit is coupled to the first output node, the second output node and the second comparator, receives the boost voltage, and is controlled by the second control signal to convert the boost voltage into a drive voltage and output the drive voltage to the second output node. The boost voltage is determined by the first reference voltage, the drive voltage is determined by the second reference voltage.

Based on the above, the voltage generating circuit of the present disclosure is able to reduce the use of high-voltage components to achieve the purpose of reducing the area. Moreover, it is possible to overcome the problem of poor output precision caused by high-voltage components.

In order to make the above-mentioned features and advantages of the present disclosure more comprehensible, the following specific embodiments are described in detail in conjunction with the accompanying drawings.

DETAILED DESCRIPTION OF DISCLOSED EMBODIMENTS

Figure 1:
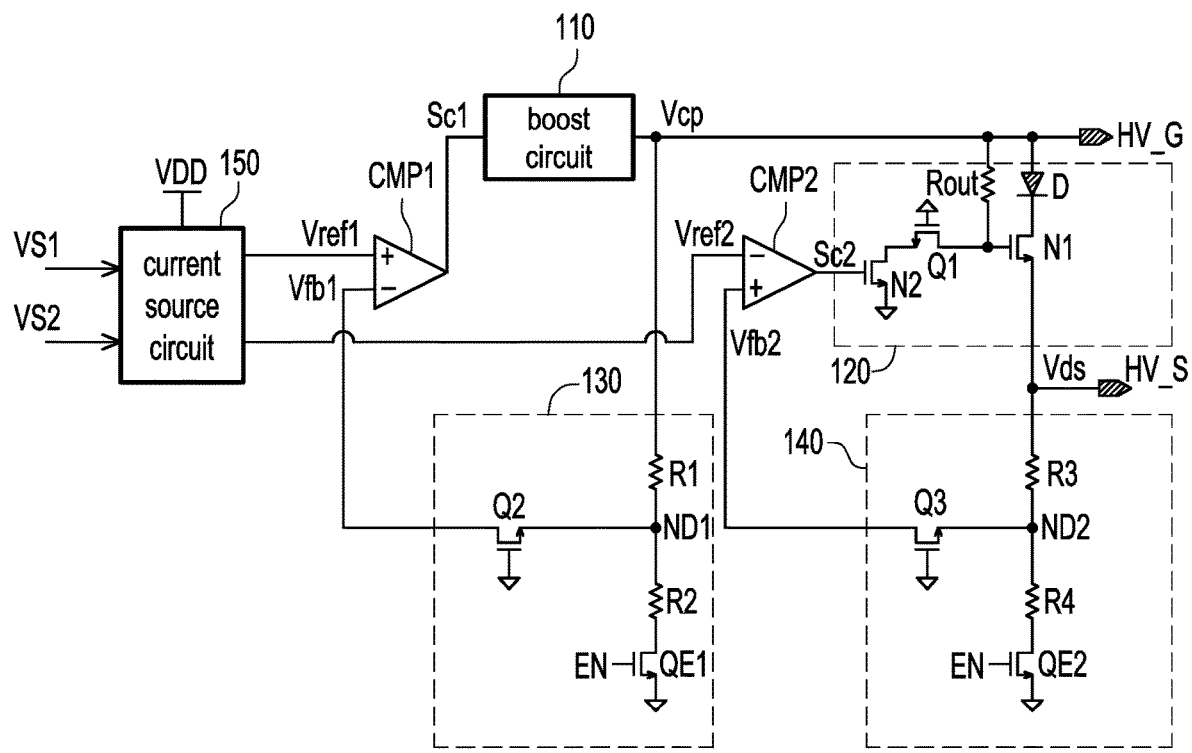
FIG. 1 is a schematic circuit diagram of a voltage generating circuit according to an embodiment of the present disclosure.

Please refer to FIG. 1, a voltage generating circuit 100 is adaptable for providing stable voltages to semiconductor memory devices such as NAND-type or NOR-type flash memories for performing reading, programming and erasing operations, including the step voltage used in the ISPP and ISPE operations. The voltage generating circuit 100 includes a first comparator CMP1, a second comparator CMP2, a boost circuit 110, an output circuit 120, a first feedback circuit 130, a second feedback circuit 140 and a current source circuit 150.

The non-inverting input terminal of the first comparator CMP1 receives the first reference voltage Vref1, and the inverting input terminal receives the first feedback voltage Vfb1 generated based on the first output node HV_G. The first comparator CMP1 serves to compare the first reference voltage Vref1 and the first feedback voltage Vfb1, and generate the first control signal Sc1 according to the comparison result. For example, when the first reference voltage Vref1 is greater than the first feedback voltage Vfb1, the first comparator CMP1 generates the first control signal Sc1 with a high logic level, and when the first reference voltage Vref1 is lower than the first feedback voltage Vfb1, the first comparator CMP1 generates the first control signal Sc1 with a low logic level.

The boost circuit 110 is, for example, a charge pump, and is coupled to the first comparator CMP1 and the first output node HV_G. The boost circuit 110 may be controlled by the first control signal Sc1 to output the boost voltage Vcp to the first output node HV_G. For example, the boost circuit 110 may continuously increase the boost voltage Vcp in response to the first control signal Sc1 at a high logic level until the first control signal Sc1 turns to a low logic level.

The inverting input terminal of the second comparator CMP2 receives the second reference voltage Vref2, and the non-inverting input terminal receives the second feedback voltage Vfb2 generated based on the second output node HV_S. The second comparator CMP2 serves to compare the second reference voltage Vref2 and the second feedback voltage Vfb2, and generate the second control signal Sc2 according to the comparison result. For example, when the second feedback voltage Vfb2 is greater than the second reference voltage Vref2, the second comparator CMP2 generates a second control signal Sc2 of a high logic level, and when the second feedback voltage Vfb2 is less than the second reference voltage Vref2, the second comparator CMP2 generates a second control signal Sc2 of a low logic level.

The output circuit 120 is coupled to the first output node HV_G, the second output node HV_S and the second comparator CMP2. The output circuit 120 receives the boost voltage Vcp, and is controlled by the second control signal Sc2 to convert the boost voltage Vcp into a drive voltage Vds and output the drive voltage to the second output node HV_S. In terms of circuit structure, the output circuit 120 includes a diode D, a first N-type field effect transistor N1, an output resistor Rout, a second N-type field effect transistor N2 and a first protection transistor Q1. The anode of the diode D is coupled to the first output node HV_G. The drain of the first N-type field effect transistor N1 is coupled to the cathode of the diode D, and the source of the first N-type field effect transistor N1 is coupled to the second output node HV_S. A first terminal of the output resistor Rout is coupled to the first output node HV_G, and a second terminal of the output resistor Rout is coupled to the gate of the first N-type field effect transistor N1. The source of the second N-type field effect transistor N2 is coupled to the ground potential (0 volts), and the gate of the second N-type field effect transistor N2 is coupled to the output terminal of the second comparator CMP2 to receive the second control signal Sc2. The first terminal of the first protection transistor Q1 is coupled to the drain of the second N-type field effect transistor N2, the second terminal is coupled to the gate of the first N-type field effect transistor N1, and the control terminal is coupled to the ground potential.

The first feedback circuit 130 is coupled to the inverting input terminal of the first comparator CMP1 and the first output node HV_G. The first feedback circuit 130 may generate the first feedback voltage Vfb1 to the inverting input terminal of the first comparator CMP1 according to the boost voltage Vcp. In terms of circuit structure, the first feedback circuit 130 includes a first resistor R1, a second resistor R2, a first enable transistor QE1 and a second protection transistor Q2. The first resistor R1 is coupled between the first output node HV_G and the first feedback node ND1. The second resistor R2 is coupled between the first feedback node ND1 and the ground potential. The first enable transistor QE1 is connected in series with the second resistor R2 on the circuit path between the first feedback node ND1 and the ground potential, and is configured to be turned on or off according to the enable signal EN. The first terminal of the second protection transistor Q2 is coupled to the first feedback node ND1, the second terminal is coupled to the inverting input terminal of the first comparator CMP1, and the control terminal is coupled to the ground potential.

The second feedback circuit 140 is coupled to the non-inverting input terminal of the second comparator CMP2 and the second output node HV_S. The second feedback circuit 140 may generate a second feedback voltage Vfb2 to the non-inverting input terminal of the second comparator CMP2 according to the drive voltage Vds. In terms of circuit structure, the second feedback circuit 140 includes a third resistor R3, a fourth resistor R4, a second enable transistor QE2 and a third protection transistor Q3. The third resistor R3 is coupled between the second output node HV_S and the second feedback node ND2. The fourth resistor R4 is coupled between the second feedback node ND2 and the ground potential. The second enable transistor QE2 is connected in series with the fourth resistor R4 on the circuit path between the second feedback node ND2 and the ground potential, and is configured to be turned on or off according to the enable signal EN. The first terminal of the third protection transistor Q3 is coupled to the second feedback node ND2, the second terminal is coupled to the non-inverting input terminal of the second comparator CMP2, and the control terminal is coupled to the ground potential. The first protection transistor Q1, the second protection transistor Q2, and the third protection transistor Q3 are basically in a normally on state, and may serve to protect other components.

The current source circuit 150 is coupled to the first comparator CMP1 and the second comparator CMP2. The current source circuit 150 operates under the power supply voltage VDD, and may adjust the first reference voltage Vref1 according to the first voltage generating code VS1 and the second voltage generating code VS2, and adjust the second reference voltage Vref2 according to the first voltage generating code VS1.

In this embodiment, the boost voltage Vcp is determined by the first reference voltage Vref1, and the drive voltage Vds is determined by the second reference voltage Vref2. When the voltage generating circuit 100 is activated, the first enable transistor QE1 and the second enable transistor QE2 will be turned on due to receiving the enable signal EN of a high logic level. According to a voltage divider circuit formed by the first resistor R1 and the second resistor R2, the boost voltage Vcp may be expressed through the following formula (1):

$$Vcp = Vfb1^* \ (R1+R2)/R2 \qquad (1)$$

The boost circuit 110 will continue to increase the boost voltage Vcp until the first control signal Sc1 changes to a low logic level. Therefore, the boost voltage Vcp will enter a steady state when the first feedback voltage Vfb1 is equal to the first reference voltage Vref1. At this stage, the boost voltage Vcp may be expressed through the following formula (2):

$$Vcp = Vref1^* \ (R1+R2)/R2 \qquad (2)$$

Similarly, according to the voltage divider circuit formed by the third resistor R3 and the fourth resistor R4, the drive voltage Vds may be represented by the following formula (3):

$$Vds = Vfb2^* \ (R3+R4)/R4 \qquad (3)$$

In FIG. 1, when the second control signal Sc2 is at a low logic level, the second N-type field effect transistor N2 is turned off, and the first N-type field effect transistor N1 is turned on. In this case, the drive voltage Vds will be changed along with the boost voltage Vcp until the second control signal Sc2 turns to a high logic level to turn on the second N-type field effect transistor N2 and turn off the first N-type field effect transistor N1. Therefore, the drive voltage Vds enters a steady state when the second feedback voltage Vfb2 is equal to the second reference voltage Vref2. At this stage, the drive voltage Vds may be expressed through the following formula (4):

$$Vds = Vref2^* \ (R3 + R4)/R4 \quad (4)$$

As shown in the above formula (2) and formula (4), through the circuit structure of the voltage generating circuit 100 of the embodiment of the present disclosure, the boost voltage Vcp may be adjusted according to the first reference voltage Vref1, and the boost voltage Vcp may be adjusted according to the second reference voltage Vref2, and the voltage difference between the first output node HV_G and the second output node HV_S may be controlled separately. In this way, the boost voltage Vcp and the drive voltage Vds may be generated precisely while reducing the use of high-voltage components (such as potentiometers) for the semiconductor memory device to perform various operations.

In practical applications, the first resistor R1 and the third resistor R3 may adopt 114 k ohms, and the second resistor R2 and the fourth resistor R4 may adopt 6 k ohms. However, those skilled in the art may make appropriate adjustments depending on their actual needs.

Figure 2:
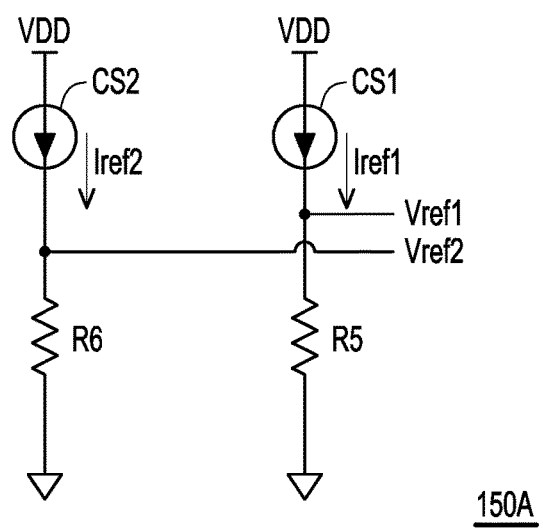
FIG. 2 is a schematic circuit diagram of a current source circuit according to an embodiment of the present disclosure.

The following examples illustrate the implementation details of the current source circuit. Please refer to FIG. 1 and FIG. 2 at the same time. The current source circuit 150A includes a first current source CS1, a second current source CS2, a fifth resistor R5 and a sixth resistor R6. A first terminal of the first current source CS1 is coupled to the power supply voltage VDD, and a second terminal is coupled to the non-inverting input terminal of the first comparator CMP1. A first terminal of the fifth resistor R5 is coupled to the second terminal of the first current source CS1, and the second terminal is coupled to the ground potential. A first terminal of the second current source CS2 is coupled to the power supply voltage VDD, and a second terminal is coupled to the inverting input terminal of the second comparator CMP2. The first terminal of the sixth resistor R6 is coupled to the second terminal of the second current source CS2, and the second terminal is coupled to the ground potential. The first current source CS1 is configured to generate a first reference current Iref1 according to the first voltage generating code VS1 and the second voltage generating code VS2 to provide the first reference voltage Vref1 to the non-inverting input terminal of the first comparator CMP1. At this stage, the boost voltage Vcp may be expressed by the following formula (5):

$$Vcp = Iref1^* \ R5^* \ (R1 + R2)/R2 \quad (5)$$

The second current source CS2 is configured to generate a second reference current Iref2 according to the first voltage generating code VS1 to provide a second reference voltage Vref2 to the inverting input terminal of the second comparator CMP2. At this stage, the drive voltage Vds may be expressed through the following formula (6):

$$Vds = Iref2^* \ R6^* \ (R3 + R4)/R4 \quad (6)$$

In practical applications, the fifth resistor R5 and the sixth resistor R6 may adopt 100 k ohms, but those skilled in the art may make appropriate adjustments according to their actual needs.

Another embodiment is given below to illustrate the implementation details of the current source circuit. Please refer to FIG. 1 and FIG. 3 at the same time. The current source circuit 150B includes a bias voltage circuit 300, a trimming current generating circuit 310, a basic current generating circuit 320, an overdrive current generating circuit 330 and a current mirror circuit 340. The bias circuit 300 is configured to generate a bias current Ibias (which is, for example, 4 microamperes).

The trimming current generating circuit 310 is coupled to the bias circuit 300. The trimming current generating circuit 310 may generate multiple weighted currents Iw1~Iw6 in a binary weighted incremental manner based on the bias current Ibias, and select the currents to be summed from the weighted currents Iw1~Iw6 according to the first voltage generating code VS1, so as to generate trimming current Itrim. The current values of the weighted currents Iw1~Iw6 are increased in binary weighting from low to high based on the mirror ratio of the transistors in the circuit. For example, the weighted current Iw1 is 0.1 microamperes, the weighted current Iw2 is 0.2 microamperes, the weighted current Iw3 is 0.4 microamperes, the weighted current Iw4 is 0.8 microamperes, the weighted current Iw5 is 1.6 microamperes, and the weighted current Iw6 is 3.2 microamperes.

The basic current generating circuit 320 is coupled to the bias circuit 300 and the trimming current generating circuit 310. The basic current generating circuit 320 is configured to generate the basic current Ib. The basic current Ib is provided to generate the lowest drive voltage Vds, for example, 5.7 microamperes.

The overdrive current generating circuit 330 is coupled to the bias circuit 300. The overdrive current generating circuit 330 may generate the overdrive current Iov according to the second voltage generating code VS2. The overdrive current Iov may be used to determine the voltage difference between the boost voltage Vcp and the drive voltage Vds.

The current mirror circuit 340 is coupled to the bias voltage circuit 300, the trimming current generating circuit 310, the basic current generating circuit 320 and the overdrive current generating circuit 330. The current mirror circuit 340 may sum up the trimming current Itrim, the basic current Ib and the overdrive current Iov to generate the first reference current Iref1, so as to provide the first reference voltage Vref1 to the non-inverting input terminal of the first comparator CMP1. Moreover, the trimming current Itrim and the basic current Ib may be summed up to generate a second reference current Iref2 to provide a second reference voltage Vref2 to the inverting input terminal of the second comparator CMP2. In other words, the first reference current Iref1 is equal to the sum of the trimming current Itrim, the basic current Ib and the overdrive current Iov, and the second reference current Iref2 is equal to the sum of the trimming current Itrim and the basic current Ib. Under the circumstances, the boost voltage Vcp may be expressed through the following formula (7), and the drive voltage Vds may be expressed through the following formula (8):

$$Vcp = (Ib + Itrim + Iov)^* \ R5^* \ (R1 + R2)/R2 \quad (7)$$

$$Vds = (Ib + Itrim)^* \ R6^* \ (R3 + R4)/R4 \quad (8)$$

In terms of circuit structure, the current mirror circuit 340 includes a third enable transistor QE3, first to eleventh P-type field effect transistors P1~P11, a third N-type field effect transistor N3, a fourth N-type field effect transistor N4, a fifth resistor R5 and a sixth resistor R6. The first terminal of the third enable transistor QE3 is coupled to the power supply voltage VDD, and the control terminal is coupled to the reverse enable signal ENB. The source of the first P-type field effect transistor P1 is coupled to the second terminal of the third enable transistor QE3. The source of the second P-type field effect transistor P2 is coupled to the drain of the first P-type field effect transistor P1, and the drain of the second P-type field effect transistor P2 is coupled to the gate of the first P-type field effect transistor P1, the trimming current generating circuit 310 and the basic current generating circuit 320. The source of the third P-type field effect transistor is coupled to the second terminal of the third enable transistor QE3, and the gate of the third P-type field effect transistor is coupled to the gate of the first P-type field effect transistor P1. The source of the fourth P-type field effect transistor P4 is coupled to the drain of the third P-type field effect transistor P3, and the drain of the fourth P-type field effect transistor P4 is coupled to the reverse input terminal of the second comparator CMP2. The gate of the fourth P-type field effect transistor P4 is coupled to the gate of the second P-type field effect transistor P2. The source of the fifth P-type field effect transistor P5 is coupled to the second terminal of the third enable transistor QE3, and the gate of the fifth P-type field effect transistor P5 is coupled to the gate of the first P-type field effect transistor P1. The source of the sixth P-type field effect transistor P6 is coupled to the drain of the fifth P-type field effect transistor P5, the drain of the sixth P-type field effect transistor P6 is coupled to the non-inverting input terminal of the first comparator CMP1, and the gate of the sixth P-type field effect transistor P6 is coupled to the gate of the second P-type field effect transistor P2. The source of the seventh P-type field effect transistor P7 is coupled to the second terminal of the third enable transistor QE3. The source of the eighth P-type field effect transistor P8 is coupled to the drain of the seventh P-type field effect transistor P7, the drain of the eighth P-type field effect transistor P8 is coupled to the drain of the sixth P-type field effect transistor P6, and the gate of the eighth P-type field effect transistor P8 is coupled to the gate of the second P-type field effect transistor P2. The source of the ninth P-type field effect transistor P9 is coupled to the second terminal of the third enable transistor QE3, and the gate of the ninth P-type field effect transistor P9 is coupled to the gate of the seventh P-type field effect transistor P7. The source of the tenth P-type field effect transistor P10 is coupled to the drain of the ninth P-type field effect transistor P9, the drain of the tenth P-type field effect transistor P10 is coupled to the gate of the ninth P-type field effect transistor P9 and the overdrive current generating circuit 330, and the gate of the tenth P-type field effect transistor P10 is coupled to the gate of the second P-type field effect transistor P2. The source of the eleventh P-type field effect transistor P11 is coupled to the power supply voltage VDD, and the drain and gate of the eleventh P-type field effect transistor P11 are jointly coupled to the gate of the second P-type field effect transistor P2. The drain of the third N-type field effect transistor N3 is coupled to the drain of the eleventh P-type field effect transistor P11, and the gate of the third N-type field effect transistor N3 is coupled to the bias circuit 300. The drain of the fourth N-type field effect transistor N4 is coupled to the source of the third N-type field effect transistor N3, the source of the fourth N-type field effect transistor N4 is coupled to the ground potential, and the gate of the fourth N-type field effect transistor N4 is coupled to the bias circuit 300. The first terminal of the fifth resistor R5 is coupled to the drain of the sixth P-type field effect transistor P6, and the second terminal is coupled to the ground potential. The first terminal of the sixth resistor R6 is coupled to the drain of the fourth P-type field effect transistor P4, and the second terminal is coupled to the ground potential.

The bias circuit 300 includes a third current source CS3, a fifth N-type field effect transistor N5, a fourth current source CS4, a sixth N-type field effect transistor N6, a seventh N-type field effect transistor N7, a fourth enable transistor QE4 and a fifth enable transistor QE5. A first terminal of the third current source CS3 is coupled to the power supply voltage VDD. The drain and gate of the fifth N-type field effect transistor N5 are jointly coupled to the second terminal of the third current source CS3 and the gate of the third N-type field effect transistor N3 in the current mirror circuit 340, and the source of the fifth N-type field effect transistor N5 is coupled to the ground potential. The first terminal of the fourth current source CS4 is coupled to the power supply voltage VDD. The drain of the sixth N-type field effect transistor N6 is coupled to the second terminal of the fourth current source CS4, and the gate of the sixth N-type field effect transistor N6 is coupled to the gate of the third N-type field effect transistor N3. The drain of the seventh N-type field effect transistor N7 is coupled to the source of the sixth N-type field effect transistor N6, the gate of the seventh N-type field effect transistor N7 is coupled to the drain of the sixth N-type field effect transistor N6 and the gate of the fourth N-type field effect transistor N4 in the current mirror circuit 340, and the source of the seventh N-type field effect transistor N7 is coupled to the ground potential. The first terminal of the fourth enable transistor QE4 is coupled to the drain of the fifth N-type field effect transistor N5, the second terminal is coupled to the ground potential, and the control terminal is coupled to the reverse enable signal ENB. The first terminal of the fifth enable transistor QE5 is coupled to the drain of the sixth N-type field effect transistor N6, the second terminal is coupled to the ground potential, and the control terminal is coupled to the reverse enable signal ENB.

The trimming current generating circuit 310 includes eighth to twenty-seventh N-type field effect transistors N8~N27. The drain of the eighth N-type field effect transistor N8 is coupled to the drain of the second P-type field effect transistor P2 in the current mirror circuit 340, and the gate of the eighth N-type field effect transistor N8 is coupled to the first encoding signal TR1. The drain of the ninth N-type field effect transistor N9 is coupled to the source of the eighth N-type field effect transistor N8. The drain of the tenth N-type field effect transistor N10 is coupled to the source of the ninth N-type field effect transistor N9, and the gate of the tenth N-type field effect transistor N10 is coupled to the gate of the ninth N-type field effect transistor N9 and the gate of the sixth N-type field effect transistor in the bias circuit 300. The drain of the eleventh N-type field effect transistor N11 is coupled to the source of the tenth N-type field effect transistor N10. The drain of the twelfth N-type field effect transistor N12 is coupled to the source of the eleventh N-type field effect transistor N11, the source of the twelfth N-type field effect transistor N12 is coupled to the ground potential, and the gate of the twelfth N-type field effect transistor N12 is coupled to the gate of the eleventh N-type field effect transistor N11 and the gate of the seventh N-type field effect transistor N7 in the bias circuit 300. The drain of the thirteenth N-type field effect transistor N13 is coupled to the drain of the second P-type field effect transistor P2, and the gate of the thirteenth N-type field effect transistor N13 is coupled to the second encoding signal TR2. The drain of the fourteenth N-type field effect transistor N14 is coupled to the source of the thirteenth N-type field effect transistor N13, and the gate of the fourteenth N-type field effect transistor N14 is coupled to the gate of the sixth N-type field effect transistor N6. The drain of the fifteenth N-type field effect transistor N15 is coupled to the source of the fourteenth N-type field effect transistor N14, the source of the fifteenth N-type field effect transistor N15 is coupled to ground potential, and the gate of the fifteenth N-type field effect transistor N15 is coupled to the gate of the seventh N-type field effect transistor N7. The drain of the sixteenth N-type field effect transistor N16 is coupled to the drain of the second P-type field effect transistor P2, and the gate of the sixteenth N-type field effect transistor N16 is coupled to the third encoding signal TR3. The drain of the seventeenth N-type field effect transistor N17 is coupled to the source of the sixteenth N-type field effect transistor N16, and the gate of the seventeenth N-type field effect transistor N17 is coupled to the gate of the sixth N-type field effect transistor. The drain of the eighteenth N-type field effect transistor N18 is coupled to the source of the seventeenth N-type field effect transistor N17, the source of the eighteenth N-type field effect transistor N18 is coupled to the ground potential, and the gate of the eighteenth N-type field effect transistor N18 is coupled to the gate of the seventh N-type field effect transistor N7. The drain of the nineteenth N-type field effect transistor N19 is coupled to the drain of the second P-type field effect transistor P2, and the gate of the nineteenth N-type field effect transistor N19 is coupled to the fourth encoding signal TR4. The drain of the twentieth N-type field effect transistor N20 is coupled to the source of the nineteenth N-type field effect transistor N19, and the gate of the twentieth N-type field effect transistor N20 is coupled to the gate of the sixth N-type field effect transistor N6. The drain of the twenty-first N-type field effect transistor N21 is coupled to the source of the twenty-first N-type field effect transistor N20, the source of the twenty-first N-type field effect transistor N21 is coupled to the ground potential, and the gate of the twenty-first N-type field effect transistor N21 is coupled to the gate of the seventh N-type field effect transistor N7. The drain of the twenty-second N-type field effect transistor N22 is coupled to the drain of the second P-type field effect transistor P2 of the twenty-second N-type field effect transistor N22, and the gate of the twenty-second N-type field effect transistor N22 is coupled to the fifth encoding signal TR5. The drain of the twenty-third N-type field effect transistor N23 is coupled to the source of the twenty-second N-type field effect transistor N22, and the gate of the twenty-third N-type field effect transistor N23 is coupled to the gate of the sixth N-type field effect transistor N6. The drain of the twenty-fourth N-type field effect transistor N24 is coupled to the source of the twenty-third N-type field effect transistor N23, the source of the twenty-fourth N-type field effect transistor N24 is coupled to the ground potential, and the gate of the twenty-fourth N-type field effect transistor N24 is coupled to the gate of the seventh N-type field effect transistor N7. The drain of the twenty-fifth N-type field effect transistor N25 is coupled to the drain of the second P-type field effect transistor P2, and the gate of the twenty-fifth N-type field effect transistor N25 is coupled to the sixth encoding signal TR6. The drain of the twenty-sixth N-type field effect transistor N26 is coupled to the source of the twenty-fifth N-type field effect transistor N25, and the gate of the twenty-sixth N-type field effect transistor N26 is coupled to the gate of the sixth N-type field effect transistor N6. The drain of the twenty-seventh N-type field effect transistor N27 is coupled to the source of the twenty-sixth N-type field effect transistor N26, the source of the twenty-seventh N-type field effect transistor N27 is coupled to the ground potential, and the gate of the twenty-seventh N-type field effect transistor N27 is coupled to the gate of the seventh N-type field effect transistor N7.

The basic current generating circuit 320 includes a twenty-eighth N-type field effect transistor N28 and a twenty-ninth N-type field effect transistor N29. The drain of the twenty-eighth N-type field effect transistor N28 is coupled to the drain of the second P-type field effect transistor P2 in the current mirror circuit 340, and the gate of the twenty-eighth N-type field effect transistor N28 is coupled to the gate of the sixth N-type field effect transistor N6 in the bias circuit 300. The drain of the twenty-ninth N-type field effect transistor N29 is coupled to the source of the twenty-eighth N-type field effect transistor N28, the source of the twenty-ninth N-type field effect transistor N29 is coupled to the ground potential, and the gate of the twenty-ninth N-type field effect transistor N29 is coupled to the gate of the seventh N-type field effect transistor N7 in the bias circuit 300.

Figure 3:
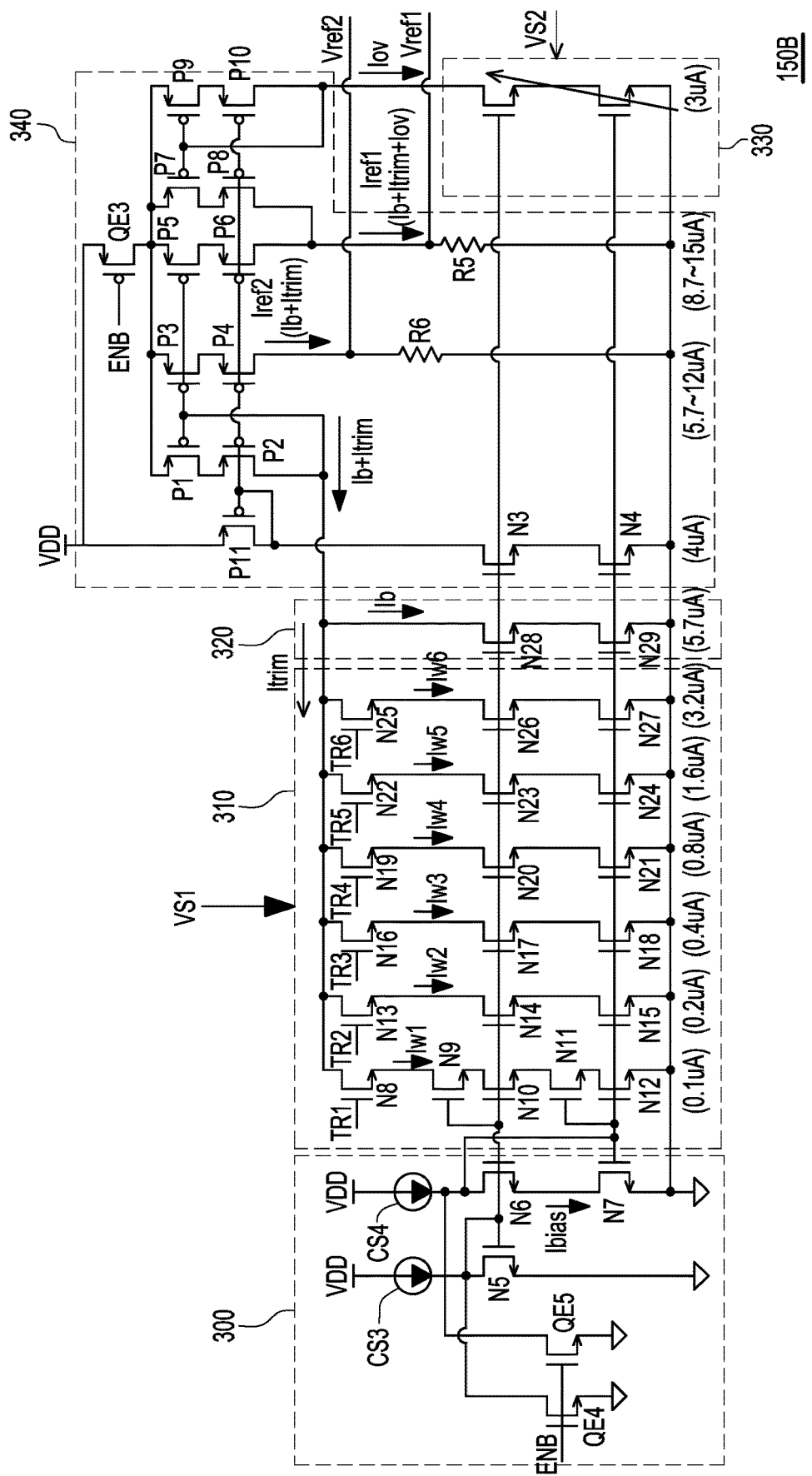
FIG. 3 is a schematic circuit diagram of a current source circuit according to another embodiment of the present disclosure.

In operation, the logic level of the reverse enable signal ENB is complementary to the logic level of the enable signal EN. When the voltage generating circuit 100 is activated, the third enable transistor QE3 will be turned on due to receiving the reverse enable signal ENB of the low logic level, and the fourth enable transistor QE4 and the fifth enable transistor QE5 will be turned off due to receiving the reverse enable signal ENB of the low logic level. In this way, after the fifth P-type field effect transistor P5, the sixth P-type field effect transistor P6, the seventh P-type field effect transistor P7, and the eighth P-type field effect transistor P8 are connected in parallel as shown in FIG. 3, the first reference current Iref1 formed by the sum of the trimming current Itrim, the basic current Ib and the overdrive current Iov will be generated on the circuit path formed by the above transistors P5~P8 and the fifth resistor R5 connected in series. The second reference current Iref2 formed by the sum of the trimming current Itrim and the basic current Ib will be generated on the circuit path formed by the third P-type field effect transistor P3, the fourth P-type field effect transistor P4 and the sixth resistor R6 connected in series.

In addition, the six bits of the first voltage generating code VS1 are, for example, respectively input to the gates of the eighth N-type field effect transistor N8, the thirteenth N-type field effect transistor N13, the sixteenth N-type field-effect transistor N16, the nineteenth N-type field-effect transistor N19, the twenty-second N-type field-effect transistor N22, and the twenty-fifth N-type field-effect transistor N25 as the first to the sixth encoding signals TR1~TR6 to control the on or off of these transistors. By combining the six bits of the first voltage generating code VS1, it is possible to set 64 trimming currents Itrim. In this way, the trimming current Itrim may be adjusted during ISPP and ISPE operations to generate appropriate boost voltage Vcp and the drive voltage Vds.

It is worth mentioning that the internal structure of the basic current generating circuit 320 may also be similar to that of the overdrive current generating circuit 330, so that the overdrive current Iov is generated according to the second voltage generating code VS2, but the present disclosure is not limited thereto.

In summary, the voltage generating circuit of the present disclosure not only is able to reduce the occupied area, but is also able to effectively improve the precision of the output voltage while reducing the use of high-voltage components, thereby reducing production costs.

What is claimed is:

1. A voltage generating circuit, comprising:
a first comparator, which compares a first reference voltage with a first feedback voltage generated based on a first output node, and generates a first control signal according to a comparison result;
a boost circuit, which is coupled to the first comparator and the first output node, and is controlled by the first control signal to output a boost voltage to the first output node;
a second comparator, which compares a second reference voltage with a second feedback voltage generated based on a second output node, and generates a second control signal according to a comparison result; and
an output circuit, which is coupled to the first output node, the second output node and the second comparator, receives the boost voltage, and is controlled by the second control signal to convert the boost voltage into a drive voltage and output the drive voltage to the second output node,
wherein the boost voltage is determined by the first reference voltage, and the drive voltage is determined by the second reference voltage.

2. The voltage generating circuit according to claim 1, wherein when the first reference voltage is greater than the first feedback voltage, the first comparator generates the first control signal with a high logic level, and when the first reference voltage is lower than the first feedback voltage, the first comparator generates the first control signal with a low logic level.

3. The voltage generating circuit according to claim 1, wherein when the second feedback voltage is greater than the second reference voltage, the second comparator generates the second control signal of a high logic level, and when the second feedback voltage is less than the second reference voltage, the second comparator generates the second control signal of a low logic level.

4. The voltage generating circuit according to claim 1, wherein the boost circuit continuously increases the boost voltage in response to the first control signal of a high logic level until the first control signal turns to a low logic level, the boost voltage enters a steady state when the first feedback voltage is equal to the first reference voltage.

5. The voltage generating circuit according to claim 1, wherein the output circuit comprises:
a diode, wherein an anode of the diode is coupled to the first output node;
a first N-type field effect transistor, wherein a drain of the first N-type field effect transistor is coupled to a cathode of the diode, and a source of the first N-type field effect transistor is coupled to the second output node;
an output resistor, wherein a first terminal of the output resistor is coupled to the first output node, and a second terminal of the output resistor is coupled to a gate of the first N-type field effect transistor;
a second N-type field effect transistor, wherein a source of the second N-type field effect transistor is coupled to a ground potential, and a gate of the second N-type field effect transistor receives the second control signal; and
a first protection transistor, wherein a first terminal of the first protection transistor is coupled to a drain of the second N-type field effect transistor, a second terminal of the first protection transistor is coupled to the gate of the first N-type field effect transistor, and a control terminal of the first protection transistor is coupled to the ground potential.

6. The voltage generating circuit according to claim 5, wherein when the second control signal is at a low logic level, the second N-type field effect transistor is turned off, and the first N-type field effect transistor is turned on, under the circumstances, the drive voltage changes along with the boost voltage until the second control signal changes to a high logic level to turn on the second N-type field effect transistor and turn off the first N-type field effect transistor, the drive voltage is at a steady state when the second feedback voltage is equal to the second reference voltage.

7. The voltage generating circuit according to claim 1, further comprising:
a first feedback circuit, which is coupled to an inverting input terminal of the first comparator and the first output node, generates the first feedback voltage to the inverting input terminal of the first comparator according to the boost voltage.

8. The voltage generating circuit according to claim 7, wherein the first feedback circuit comprises:
a first resistor, which is coupled between the first output node and a first feedback node, wherein the first feedback node is coupled to the inverting input terminal of the first comparator; and
a second resistor, which is coupled between the first feedback node and a ground potential.

9. The voltage generating circuit according to claim 8, wherein the first feedback circuit further comprises:
a first enable transistor, which is connected in series with the second resistor on a circuit path between the first feedback node and the ground potential, and configured to be turned on or off according to an enable signal; and
a second protection transistor, wherein a first terminal of the second protection transistor is coupled to the first feedback node, a second terminal of the second protection transistor is coupled to the inverting input terminal of the first comparator, and a control terminal of the second protection transistor is coupled to the ground potential.

10. The voltage generating circuit according to claim 1, further comprising:
a second feedback circuit, which is coupled to a non-inverting input terminal of the second comparator and the second output node, and generates the second feedback voltage to the non-inverting input terminal of the second comparator according to the drive voltage.

11. The voltage generating circuit according to claim 10, wherein the second feedback circuit comprises:
a third resistor, which is coupled between the second output node and a second feedback node, wherein the second feedback node is coupled to the non-inverting input terminal of the second comparator; and
a fourth resistor, which is coupled between the second feedback node and a ground potential.

12. The voltage generating circuit according to claim 11, wherein the second feedback circuit further comprises:
a second enable transistor, which is connected in series with the fourth resistor on a circuit path between the second feedback node and the ground potential, and configured to be turned on or off according to an enable signal; and
a third protection transistor, wherein a first terminal of the third protection transistor is coupled to the second feedback node, a second terminal of the third protection transistor is coupled to the non-inverting input terminal of the second comparator, and a control terminal of the third protection transistor is coupled to the ground potential.

13. The voltage generating circuit according to claim 1, further comprising:
a current source circuit, which is coupled to the first comparator and the second comparator, wherein the current source circuit is operated under a power supply voltage, adjusts the first reference voltage according to a first voltage generating code and a second voltage generating code, and adjusts the second reference voltage according to the first voltage generating code.

14. The voltage generating circuit according to claim 13, wherein the current source circuit comprises:
a first current source, wherein a first terminal of the first current source is coupled to the power supply voltage, and a second terminal of the first current source is coupled to a non-inverting input terminal of the first comparator;
a fifth resistor, wherein a first terminal of the fifth resistor is coupled to a second terminal of the first current source, and a second terminal of the fifth resistor is coupled to a ground potential;
a second current source, wherein a first terminal of the second current source is coupled to the power supply voltage, and a second terminal of the second current source is coupled to an inverting input terminal of the second comparator; and
a sixth resistor, wherein a first terminal of the sixth resistor is coupled to a second terminal of the second current source, and a second terminal of the sixth resistor is coupled to the ground potential,
wherein the first current source is configured to generate a first reference current according to the first voltage generating code and the second voltage generating code to provide a first reference voltage to the non-inverting input terminal of the first comparator, the second current source is configured to generate a second reference current according to the first voltage generating code to provide the second reference voltage to the inverting input terminal of the second comparator.

15. The voltage generating circuit according to claim 13, wherein the current source circuit comprises:
a bias circuit, which generates a bias current;
a trimming current generating circuit, which is coupled to the bias circuit, generates a plurality of weighted currents in a binary weighted incremental manner based on the bias current, and selects summed currents from the plurality of weighted currents according to the first voltage generating code to generate a trimming current;
a basic current generating circuit, which is coupled to the bias circuit and the trimming current generating circuit, and configured to generate a basic current;
an overdrive current generating circuit, which is coupled to the bias circuit, and generates an overdrive current according to the second voltage generating code; and
a current mirror circuit, which is coupled to the bias circuit, the trimming current generating circuit, the basic current generating circuit and the overdrive current generating circuit, wherein the trimming current, the basic current and the overdrive current are summed up to generate a first reference current for providing the first reference voltage to a non-inverting input terminal of the first comparator, and the trimming current and the basic current are summed up to generate a second reference current for providing the second reference voltage to an inverting input terminal of the second comparator.

16. The voltage generating circuit according to claim 15, wherein the current mirror circuit comprises:
a third enable transistor, wherein a first terminal of the third enable transistor is coupled to the power supply voltage, and a control terminal of the third enable transistor is coupled to a reverse enable signal;
a first P-type field effect transistor, wherein a source of the first P-type field effect transistor is coupled to a second terminal of the third enable transistor;
a second P-type field effect transistor, wherein a source of the second P-type field effect transistor is coupled to a drain of the first P-type field effect transistor, a drain of the second P-type field effect transistor is coupled to a gate of the first P-type field effect transistor, the trimming current generating circuit and the basic current generating circuit;
a third P-type field effect transistor, wherein a source of the third P-type field effect transistor is coupled to a second terminal of the third enable transistor, and a gate of the third P-type field effect transistor is coupled to the gate of the first P-type field effect transistor;
a fourth P-type field effect transistor, wherein a source of the fourth P-type field effect transistor is coupled to a drain of the third P-type field effect transistor, a drain of the fourth P-type field effect transistor is coupled to the inverting input terminal of the second comparator, and a gate of the fourth P-type field effect transistor is coupled to a gate of the second P-type field effect transistor;
a fifth P-type field effect transistor, wherein a source of the fifth P-type field effect transistor is coupled to a second terminal of the third enable transistor, and a gate of the fifth P-type field effect transistor is coupled to the gate of the first P-type field effect transistor;
a sixth P-type field effect transistor, wherein a source of the sixth P-type field effect transistor is coupled to a drain of the fifth P-type field effect transistor, a drain of the sixth P-type field effect transistor is coupled to the non-inverting input terminal of the first comparator, and a gate of the sixth P-type field effect transistor is coupled to the gate of the second P-type field effect transistor;
a seventh P-type field effect transistor, wherein a source of the seventh P-type field effect transistor is coupled to the second terminal of the third enable transistor;
an eighth P-type field effect transistor, wherein a source of the eighth P-type field effect transistor is coupled to a drain of the seventh P-type field effect transistor, a drain of the eighth P-type field effect transistor is coupled to the drain of the sixth P-type field effect transistor, and a gate of the eighth P-type field effect transistor is coupled to the gate of the second P-type field effect transistor;
a ninth P-type field effect transistor, wherein a source of the ninth P-type field effect transistor is coupled to a second terminal of the third enable transistor, and a gate of the ninth P-type field effect transistor is coupled to a gate of the seventh P-type field effect transistor;
a tenth P-type field effect transistor, wherein a source of the tenth P-type field effect transistor is coupled to a drain of the ninth P-type field effect transistor, and a drain of the tenth P-type field effect transistor is coupled to the gate of the ninth P-type field effect transistor and the overdrive current generating circuit, a gate of the tenth P-type field effect transistor is coupled to the gate of the second P-type field effect transistor;

an eleventh P-type field effect transistor, wherein a source of the eleventh P-type field effect transistor is coupled to the power supply voltage, and a drain and a gate of the eleventh P-type field effect transistor are jointly coupled to the gate of the second P-type field effect transistor;

a third N-type field effect transistor, wherein a drain of the third N-type field effect transistor is coupled to the drain of the eleventh P-type field effect transistor, and a gate of the third N-type field effect transistor is coupled to the bias circuit;

a fourth N-type field effect transistor, wherein a drain of the fourth N-type field effect transistor is coupled to a source of the third N-type field effect transistor, a source of the fourth N-type field effect transistor is coupled to a ground potential, and a gate of the fourth N-type field effect transistor is coupled to the bias circuit;

a fifth resistor, wherein a first terminal of the fifth resistor is coupled to the drain of the sixth P-type field effect transistor, and a second terminal of the fifth resistor is coupled to the ground potential; and a sixth resistor, wherein a first terminal of the sixth resistor is coupled to the drain of the fourth P-type field effect transistor, and a second terminal of the sixth resistor is coupled to the ground potential.

17. The voltage generating circuit according to claim 16, wherein the bias circuit comprises:

a third current source, wherein a first terminal of the third current source is coupled to the power supply voltage;

a fifth N-type field effect transistor, wherein a drain and a gate of the fifth N-type field effect transistor are jointly coupled to a second terminal of the third current source and the gate of the third N-type field effect transistor, and a source of the fifth N-type field effect transistor is coupled to the ground potential;

a fourth current source, wherein a first terminal of the fourth current source is coupled to the power supply voltage;

a sixth N-type field effect transistor, wherein a drain of the sixth N-type field effect transistor is coupled to a second terminal of the fourth current source, and a gate of the sixth N-type field effect transistor is coupled to the gate of the third N-type field effect transistor;

a seventh N-type field effect transistor, wherein a drain of the seventh N-type field effect transistor is coupled to a source of the sixth N-type field effect transistor, and a gate of the seventh N-type field effect transistor is coupled to the drain of the sixth N-type field effect transistor and the gate of the fourth N-type field effect transistor, and a source of the seventh N-type field effect transistor is coupled to the ground potential;

a fourth enable transistor, wherein a first terminal of the fourth enable transistor is coupled to the drain of the fifth N-type field effect transistor, a second terminal of the fourth enable transistor is coupled to the ground potential, and a control terminal of the fourth enable transistor is coupled to the reverse enable signal; and a fifth enable transistor, wherein a first terminal of the fifth enable transistor is coupled to the drain of the sixth N-type field effect transistor, a second terminal of the fifth enable transistor is coupled to the ground potential, and a control terminal of the fifth enable transistor is coupled to the reverse enable signal.

* * * * *